United States Patent

[11] 3,591,126

| [72] | Inventor | Fred Hauser<br>1544 Midvale Ave., Los Angeles, Calif. 90024 |
|---|---|---|
| [21] | Appl. No. | 739,936 |
| [22] | Filed | June 6, 1968 |
| [45] | Patented | July 6, 1971<br>Continuation of application Ser. No. 617,949, Feb. 23, 1967, now abandoned. |

[54] PLASTIC VALVE HOUSING CONSTRUCTION WITH ADJUSTABLE TIMING STEM
13 Claims, 9 Drawing Figs.

[52] U.S. Cl. .................................................. 251/30,
29/157.1, 251/35, 251/46, 264/328
[51] Int. Cl. ..................................................... F16k 31/385
[50] Field of Search .......................................... 251/45, 46,
61, 61.1, 61.2, 61.3, 61.4, 61.5, 331, 335.1, 35, 30;
264/328

[56] References Cited
UNITED STATES PATENTS

| 1,877,780 | 9/1932 | Ackerman | 251/28 |
| 2,619,986 | 12/1952 | Goepfrich | 251/129 |
| 2,740,604 | 4/1956 | Swigart et al. | 251/61.3 |
| 3,012,751 | 12/1961 | Hauser | 251/60 |
| 3,346,004 | 10/1967 | Costello | 251/30 X |
| 3,367,621 | 2/1968 | Griswold | 251/35 |
| 3,368,582 | 2/1968 | Kotel et al. | 251/30 X |

*Primary Examiner*—Arnold Rosenthal
*Attorney*—Miketta, Glenny, Poms & Smith

ABSTRACT: This invention relates in general to water and other fluid controlling valves, particularly diaphragm-actuated-type water valves. More particularly, the present disclosure pertains to an improved plastic valve body construction adapted for use in diaphragm-actuated-type valves and an externally adjustable fluid flow control means for controlling the time required for opening and particularly for closing the valve to avoid momentarily great fluid pressures normally occurring in the associated conduits on fast closing of the valve. The relief of fluid pressure above the diaphragm to open the associated valve is accomplished by a solenoid-actuated valve mounted in a plastic housing which is easily assembled or disassembled to the plastic valve body and in an alternative exemplary embodiment, an air cushion or air pressure chamber is provided within the valve body to slow the closing of the valve means and cushion the buildup of fluid within the valve body during such closing of the valve.

PATENTED JUL 6 1971

INVENTOR.
FRED HAUSER

BY
Miketta, Glenny, Poms & Smith
ATTORNEYS.

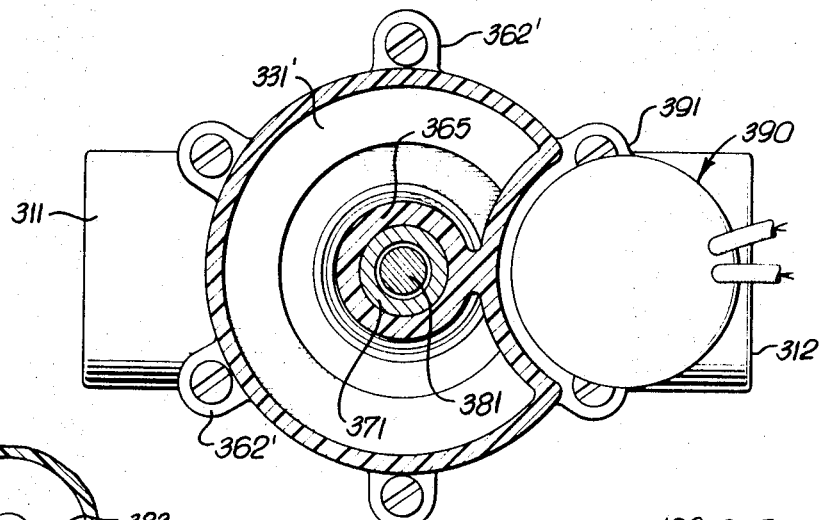
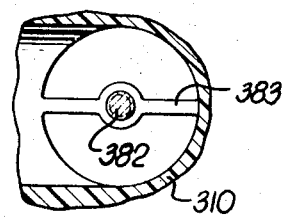
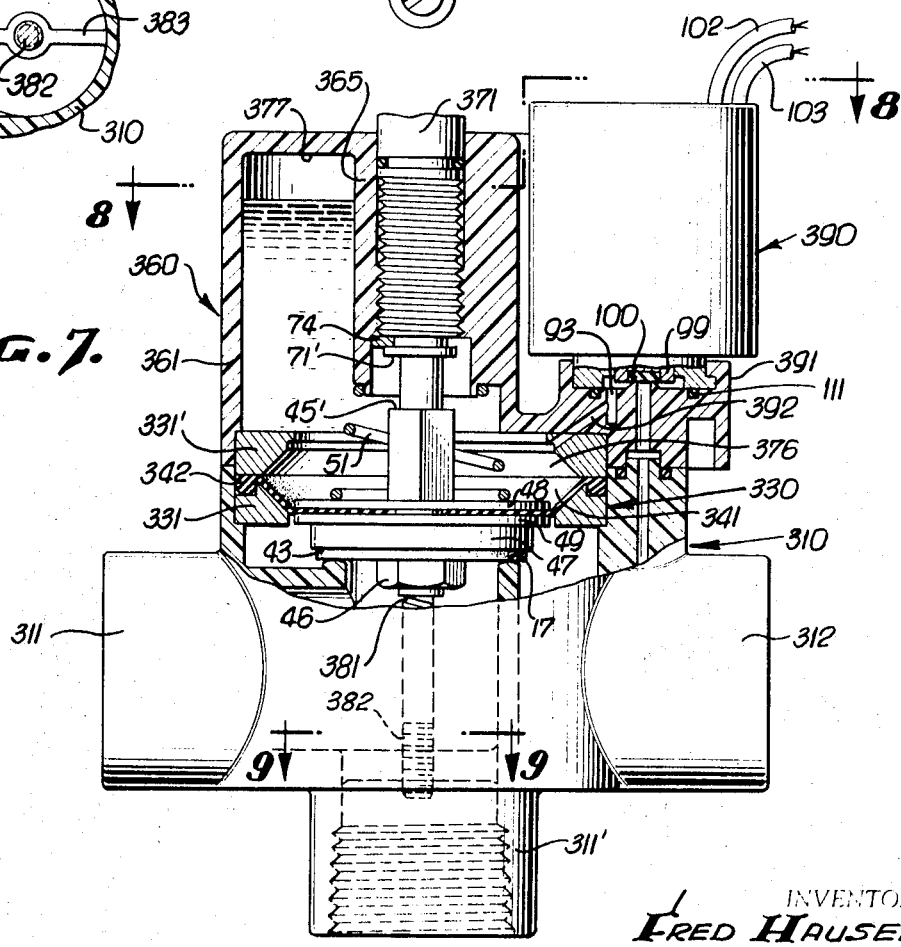

3,591,126

PLASTIC VALVE HOUSING CONSTRUCTION WITH ADJUSTABLE TIMING STEM

This is a continuation of application Ser. No. 617,949, filed Feb. 23, 1967.

BACKGROUND OF THE INVENTION

This invention is particularly suitable for use in water valves employed in lawn and golf course automatic sprinkling systems. In the prior art, such valves have been cast in bronze or other corrosive resistant heavy metals, have not been easily assembled from inexpensive and lightweight materials and have not had provisions for easily mounting a solenoid control thereto, for externally adjusting the speed at which the valve opens and closes, for varying the rate of valve opening and closing during its movement in response thereto, or for cushioning pressure fluid buildup within the valve body. It is the object of this invention to disclose and provide an improved valve construction which overcomes the disadvantages of the prior constructions and which makes provision for the additional features enumerated hereinabove not found in the prior art.

SUMMARY OF THE INVENTION

Generally stated, the present invention comprises the provision of externally adjustable means for slowing down the closing operation of the valve and the provision of an air chamber above the valve diaphragm to assist such slowing of the closing operation. It also contemplates a novel method of mounting a solenoid actuator to the valve and a novel design which makes use of plastic injection molding processes.

More particularly, means are provided for communicating inlet pressure through the valve into the valve body above the diaphragm and valve to balance inlet pressure acting on the diaphragm. As particularly contemplated within the present invention, externally adjustable fluid flow control means are provided for controlling the rate of fluid flow through the valve means. Also, such retardation of the valve-closing movement is assisted by the provision of an air pressure cushion within an enlarged chamber portion provided in the cover shell above the diaphragm. Venting of the fluid pressure chamber above the diaphragm to the valve outlet is provided to allow a controlled opening or closing of the valve. In the present improved plastic valve body construction, a plastic housing including electrically operated valve means to control such venting is provided to be easily assembled or disassembled thereto by a simple insertion and 45° turning movement of the housing to the valve body.

The entire valve body is easily and readily assembled into a tightly sealed unit which thereafter may be externally adjusted to control the rate of closing of the valve in response to buildup of pressure fluid above the diaphragm. These and various other advantages as well as objects of the present invention will become apparent to those skilled in the art from a consideration of the following detailed description of exemplary embodiments of the improved valve according to the present invention.

Reference will be to the appended sheets of drawings in which:

FIG. 7 is a partially sectioned elevational view of an alternative exemplary embodiment of the improved plastic valve body construction according to the present invention;

FIG. 8 is a plan view partially in section of the alternative exemplary apparatus of FIG. 7 taken therein along the plane 8–8 and;

FIG. 9 is a detail sectional view of the apparatus of FIG. 7 taken therein along the plane 9–9.

Figure 1:
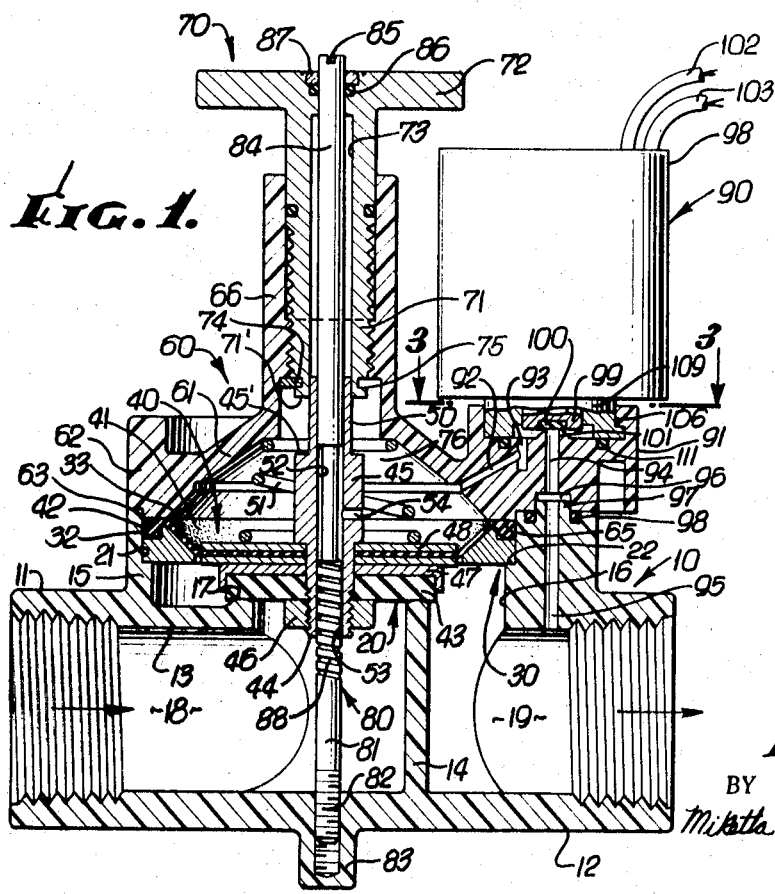
FIG. 1 is a vertical sectional view of a preferred exemplary embodiment of improved plastic valve body construction according to the present invention showing the valve closed.

A detailed explanation will now be made of a preferred exemplary embodiment of the improved plastic valve body construction according to the present invention, reference being made to FIGS. 1 through 5. Referring first to FIG. 1, it can be seen that the preferred exemplary embodiment of plastic valve body construction includes generally a plastic body shell, indicated generally at 10; an annular retainer, indicated generally at 30; a diaphragm-actuated valve means, indicated generally at 40; a one-piece generally concave cover shell, indicated generally at 60; a one-piece plastic combination handle and sleeve means, indicated generally at 70, mounted to the cover shell; an externally adjustable fluid flow control means, indicated generally at 80; and a solenoid-operated valve assembly indicated generally at 90. Generally, stated, the diaphragm-actuated valve means 40, opens or closes the associated valve passage between the valve inlet and outlet in response to upstream line pressure and the operation of the solenoid-operated valve assembly 90.

The body shell 10 in the preferred exemplary embodiment is preferrably formed by plastic injection molding to provide a hollow one-piece shell, as illustrated in FIG. 1, having a tubular inlet 11, a tubular outlet 12, a first web 13, a second web 14 and an upstanding circular wall or boss 15 surrounding a circular aperture 16. The inlet 11 and outlet 12 are internally threaded to be connected to water or other fluid pipes or conduits in conventional manner and have major axes thereof lying generally in the same plane. In the exemplary embodiment, the inlet 11 and outlet 12 are coaxial although it is contemplated that such tubular inlet and outlet may have intersecting major axes.

First web 13 is preferably an inwardly directed extension of the tubular inlet 11 which intersects the circular upstanding second web 14. Web 14 is preferably of a generally circular configuration extending upwardly from the bottom portions of the body shell to provide a circular valve seat 17 upon which the diaphragm-actuated valve means, indicated generally at 40, is adapted to seat and thereby close the outlet 12 off from the inlet 11. Web 14 may be considered as a vertical partition wall between an inlet chamber 18 and an outlet chamber 19. The valve seat 17, defining the valve opening indicated generally at 20, preferably is provided with a diameter smaller than that of the aperture 16 and is aligned coaxially therewith to receive the associated diaphragm-actuated valve means assembled within the boss 15, as hereinafter explained.

Figure 2:
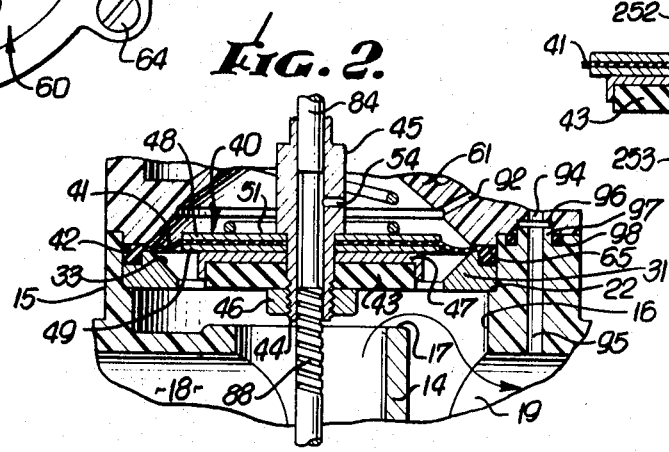
FIG. 2 is a detail view of a portion of the apparatus of FIG. 1 showing the valve partially open.
Figure 5:
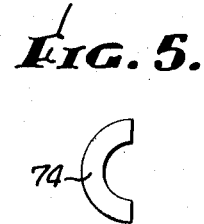
FIG. 5 is a detail view of a portion of the apparatus of FIG. 1.

After the hollow one-piece plastic body shell 10, has been molded, an annular retainer 30, is inserted into the enlarged diameter bore portion 21 of the boss or projection 15. In conventional valve bodies, produced by foundry practices, the retainer ring 30 is usually replaced by a shoulder cast integral with the body. When using plastic material, however, injection-molding techniques do not lend themselves to the use of such construction. The novel use of a separate retainer ring 30 solves the problem. At an outer portion of the aperture or bore 16, there is provided an enlarged diameter portion 21 which terminates inwardly thereof in a circular outwardly facing ledge 22 adapted to receive and support the retainer, indicated generally at 30, within the boss as illustrated. The retainer 30 is provided with a peripheral recess 32. Retainer 30 is also provided with an inner concave surface 33. Both recess 32 and inner surface 33 cooperate with the valve means 40 in positioning and supporting the valve means within the plastic valve body shell as seen in FIGS. 1 and 2 and as hereinafter explained.

The valve body construction is illustrated in use with a diaphragm-actuated-type valve indicated generally at 40. The latter includes a resilient rubberlike diaphragm 41 having a surrounding peripheral bead 42. The bead 42 of the diaphragm 41 is positioned in the notch 32 and the surrounding inner walls of boss 15. Midportions of the diaphragm 41 lie on and are supported by the retainer inner surface 33 when the valve means is in the closed position of FIG. 1.

Diaphragm-actuated valve means, indicated generally at 40, also includes a resilient gasket member 43 adapted to seal or seat upon the valve seat 17. Gasket member 43 is mounted to the lower threaded end 44 of the valve stem 45. Midportions of diaphragm 41 behind the backup plate 47 are made rigid by the provision of a pair of rigid plates 48 and 49 provided on opposite sides of the diaphragm. Nut 46 holds the gasket member 43, backup plate 47, plates 48 and 49 and the midportion of the diaphragm 41 assembled on valve stem 45 as seen in FIGS. 1 and 2. An upper end 50 of valve stem 45 is slidably received within a sleeve 71 to align the valve stem 45 and associated gasket member 43 over the valve seat 17, while allowing vertical movement thereof. Spring means 51 normally bias the valve means toward the closed position of FIG. 1 against the upstream line pressure within inlet chamber 18.

A one-piece generally concave plastic cover shell, indicated generally at 60, is bolted on the boss 15 to cover and enclose the valve means within the valve body. The cover shell 60 includes a concave body 61 with a surrounding flange 62. Flange 62 includes shoulder 63 which receives the outer end of the boss 15, the cover shell being thereby positioned on the boss and fastened thereto by conventional fastening means 64, extending portions of the cover flange 62 and cooperating enlarged mating flange portions on boss 15 (not shown). Flange 62 is also provided with an end face 65 adjacent the shoulder 63 to sealingly seat upon the diaphragm bead 42. When cover shell 60 is secured down on to the body shell, as seen in FIG. 1, the diaphragm bead 42 is tightly compressed between the face 65 and the top face of the recess 32 and the adjacent wall of bore 21, sealing the junction of the boss, retainer and cover shell against any passage of water or other fluid therebetween.

Cover shell body 60 is provided with an internally threaded tubular extension 66 formed integrally therewith as best seen in FIG. 1. Extension 66 is adapted to receive and mount a separately formed one-piece plastic combination handle and sleeve means 70. Such combination handle and sleeve means includes a sleeve portion 71 and a handle portion 72. Sleeve portion 71 is externally threaded to be longitudinally adjustable within the internal threads within the cover shell extension 66. As mentioned previously herein, sleeve 71 is hollow having an internal bore 73 adapted to receive the upper end 50 of valves stem 45. Vertical movement of valve stem 45 and the associated valve means is limited by the vertical adjustment of the sleeve 71 within the cover tubular extension 66. By reason that the shoulder 45' will contact the bottom 71' of the sleeve 71, the maximum amount of fluid flow through the valve opening, indicated generally at 20, can thereby be easily adjusted.

As contemplated within the present invention, the handle and sleeve means above described are molded out of plastic in a single piece to be easily assembled into the one-piece cover shell 60. Such assembly is accomplished prior to the securing of the cover shell to the body shell so that a C-type washer 74, seen in FIG. 5, may be placed in the notch 75 provided at the lower end of sleeve 71, as seen in FIG. 1, to prevent inadvertent removal of the handle and sleeve means after assembly.

In order to close the valve, means are provided for communicating upstream line pressure from chamber 18 into the chamber 76. As seen in FIGS. 1 and 2, the valve stem 45 is hollow having an inner bore 52 which extends down to a lower end port 53. A sidewall port 54 is provided in the valve stem 45 communicating between chamber 76 and the inner hollow bore 52 of the valve stem. In the exemplary embodiment, fluid flow control means, indicated generally at 80, are also provided within the valve stem as hereinafter explained. However, when the valve is in closed position, it can be seen from the foregoing that high-pressure fluid in chamber 18 is allowed to pass through port 53, bore 52 and port 54 into the chamber 76 acting in downward direction on disc 40. Since the disc 40 is much larger than the port 20 the upward pressure from said port is overcome and the valve remains closed. In order to selectively open the valve, solenoid-operated valve means 90, are provided for venting chamber 76 to the outlet chamber 19.

As seen in FIGS. 1 and 2, the cover shell flange 62 is provided with a solid boss 91. Solid boss 91 is provided with internal bores or passages 92, 93, and 94, as seen in FIG. 1, to communicate fluid pressure within chamber 76 to the outlet chamber 19 through the additional bore 95. Bore 94 is provided with a lower enlarged bore portion 96 to receive a mating annular prominence 97 provided in the body shell 10, with a surrounding O-ring seal 98. The communication between chambers 76 and 19 through the bores 92, 93, 94 and 95 may be selectively opened or closed through the electrical actuation of a combination solenoid and valve means 90.

Figure 3:
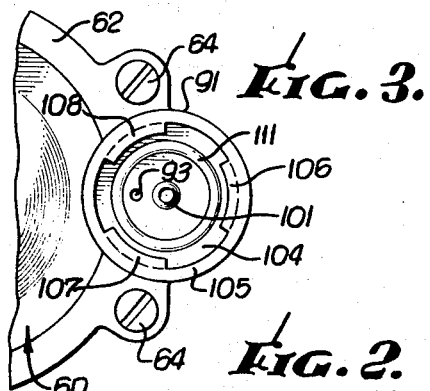
FIG. 3 is a plan view of a portion of the apparatus of FIG. 1 taken herein along the plane 3–3.

The solenoid-operated valve means 90, includes a plastic housing 98 enclosing a conventional solenoid apparatus, not shown. The movable portion of the solenoid forms a valve plunger 99 having an inner resilient valve-sealing member 100. As best seen in FIG. 3, the solid boss 91 is provided with a centrally located raised valve seat 101 at the upper end of the bore 94 to receive the resilient member 100 in the normally closed position of the solenoid valve means as seen in FIG. 1.

When it is desired to open the valve port 20, the solenoid within housing 90 may be actuated by electrical current through leadlines 102 and 103 to raise the valve plunger 99 and associated valve seal member 100 off the seat 101. Chamber 76 is thereby vented to the outlet chamber 19 allowing the valve to open to the position of FIG. 2 under the greater upstream line pressure chamber 18. The valve gasket member 43 and associated diaphragm 41 will rise during opening as shown in FIG. 2, only to the point where an equilibrium is established between the inlet pressure of chamber 18 and the outlet pressure chamber 19, which depending on the amount of pressure differential between chambers 18 and 19 may be any where between the partly opened and fully opened position allowed by the setting of the combination handle and sleeve means 70.

The solenoid 90 is easily assembled to the solid boss 91 of the cover shell through the novel construction employed. The construction used is generally referred to as a cam lock. It permits mounting and disassembling the solenoid by a simple twist. This feature is important because in the field it is often necessary to remove the solenoid after it is all wired up. This construction permits removal without disconnecting the wiring. As seen in FIG. 3, the solid boss 91 is provided with upwardly opening slots 104 formed by the surrounding outstanding circular wall 105. A plurality of spaced arcuate inwardly extending lugs 106, 107 and 108 are provided within wall 105 spaced above the bottom of slots 104. The housing 98 is provided with a depending circular support member 109 to be received within slots 104 which former is provided with a plurality of outwardly directed lugs 110 to be received through the slots 104 between the socket lugs 106, 107 and 108 upon an approximately 45° rotation thereof. An O-ring seal 111 is provided in bottom wall slots 104 to be engaged by the lower annular end face of the support member 109 as seen in FIG. 1. Such cam lock means could not readily be manufactured by the conventional sand-casting method.

It is important to cause the valve to close slowly so that the inertia of the otherwise suddenly stopped column of pressure fluid will not cause a momentarily great increase of pressure to the extent that serious damage may be done to the entire piping or conduit system. Such slow closing of the valve means, is accomplished by the provision of externally adjustable fluid flow control means disposed within the hollow valve stem 45 for controlling the rate of fluid flow from the stem port 53 through the stem sidewall port 54 into chamber 76. In the exemplary embodiment, such fluid flow control means is indicated generally at 80.

Referring particularly to FIG. 1, the exemplary externally adjustable fluid flow control means, indicated generally at 80, includes a stem 81 extending from the bottom of the body shell upwardly through the ported handle 72. Stem 81 is provided with a lower threaded end 82 received within an internally threaded housing or projection 83 integrally formed within the valve body shell 10. An upper end extension 84 extends through a port provided in the handle 72 to present an externally engageable portion 85. An O-ring seal 86 is provided with a retainer 87 to prevent escape of fluid from chamber 76 outwardly.

As particularly contemplated within the present invention, a tortuous path for fluid flow through the inner bore 52 of stem 45 is provided by a helical groove 88 provided in a portion of stem 81 extending into the valve. The rate of fluid flow from chamber 18 through bore 52 to chamber 76 is thus dependent upon the extent to which the helical portion 88 is positioned within bore 52. Such flow rate of valve closing being directly proportionate to the rate of fluid flow through the hollow valve stem. Stem 81 is stationary in whatever position of adjustment has been selected through manipulation of the external portion 85. The valve means including stem 45 move relative to the stationary stem 81 during opening and closing movement. When the valve means have moved to the open position of FIG. 2, it can be seen that stem 45 has moved upwardly relative to the helical groove portion 88 reducing the distance fluid must flow through the helical groove within the valve stem. The rate through stem 45 will be the greatest when the amount of the helical groove within stem 45 is the smallest. As the valve means closes to the position of FIG. 1, the amount of the helical groove 88 included within the valve stem increases and the rate of fluid flow therethrough diminishes. Thus as the valve means begins to close, its closing operation is slowed in response to the increasing fluid flow path through stem 45 provided by the increasing amount of helical groove 88 disposed within the valve stem bore 52. The maximum amount or distance of the helical groove 88 to be disposed within the valve stem at the closed position of FIG. 1 may be easily adjusted by turning the stem 81 by the externally engageable means 85. The stem 81 is therefore a stationary timing stem which can be adjusted to cause different rates of valve closure under given pressure differentials between the inlet chamber 18 and outlet chamber 19.

Figure 4:
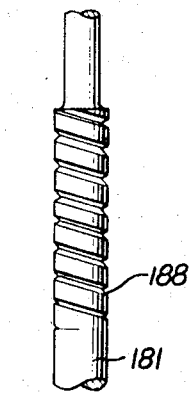
FIG. 4 is a detail view of an alternative exemplary embodiment of a portion of the apparatus of FIGS. 1 through 3.

An alternative exemplary embodiment of timing stem 181 is shown in FIG. 4 with a variable depth spiral groove 188. When this alternative embodiment of timing stem 181 is substituted for the stem 81 in FIG. 1, the rate of valve closing is proportionately more restricted as the valve nears its closed position because of the shallower depth of groove increasingly included within the valve stem passage between chamber 18 and 76. When the valve is in the open position of FIG. 2, the deeper portions of spiral groove 188 allow the passage of pressure fluid therethrough at a rate comparable to that of the spiral groove 88 illustrated in FIG. 2. However, as the increasingly shallower portions of groove 188 of the alternative exemplary embodiment of FIG. 4 are received within the valve stem bore 52, fluid flow is increasingly restricted not only because of the proportionately longer flow path (as occurs in groove 88) but because of the increasingly restricted size of the flow path provided by the shallower portions of groove 188.

Figure 6:
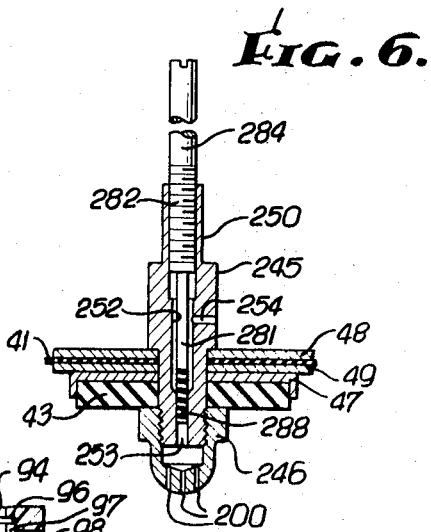
FIG 6 is a detail view of an alternative construction for a portion of the apparatus of FIG. 1.

A still further alternative exemplary embodiment of the externally adjustable fluid flow control means, is disclosed in FIG. 6. In this further modification, the timing stem 281 is provided with an upper portion 284 adapted to pass upwardly and out of the combination handle and sleeve means. However the portion 284 of FIG. 6 is provided with a threaded portion 282 received within an internally threaded upper end 250 of an alternative embodiment of valve stem 245. As in the prior embodiments, the valve stem 245 is provided with a sidewall port 254 which communicates by way of an internal bore 252 with a bottom end port 253 open to upstream pressure of chamber 18. Timing stem 281 is provided with the adjustable helical groove portion 288 positioned within the bore 252 of the valve stem as in the prior embodiments. However, in this alternative exemplary embodiment of FIG. 6, the stem 281 terminates above port 253, and being mounted to stem 245, moves vertically therewith as the valve opens and closes. The fluid flow rate through the helical passage provided by groove 288 and the surrounding walls of bore 252 may be varied by externally adjusting the timing stem 281 vertically relative to the valve stem 245. The nut 246, may be provided with holes 200 which act as a filter.

Referring now to FIGS. 7 through 9, an alternative exemplary embodiment of the improved plastic valve body construction is similar to the previously described construction with the exception that it is provided with a second inlet 311' to allow this valve to operate as an angle or globe valve at the discretion of the user. The unused inlet would normally be plugged. As shown in FIG. 9, the alternative inlet 311' is provided with a web 383 spanning the inlet opening into which the threaded lower end 382 of the timing stem 381 is positioned. The timing stem functions as previously described.

In addition, a separate additional 331' is provided in addition to the previously disclosed annular retainer 330 including ring 331. It serves the same function as the concave body 61 of the cover shell 60 in FIG. 1. It is also noted that bore 392 in the cover shell flange continues through retainer 331' as seen in FIG. 7.

As discussed hereinabove, it is important to open and especially close the valve slowly to prevent undue exertion of pressure on the piping or conduit system associated with the valve. In the preferred as well as the present alternative embodiment, the slow closing of the valve is accomplished through the provision of a tortuous fluid flow path, as by helical groove, through a bore within the valve stem communicating between the high-pressure fluid at the valve inlets 311, 311' and the valve outlet 312. The volumetric displacement of the diaphragm means within chamber 76 represents the volume of pressure fluid generally required to cause closing of the valve. As already explained, this volume of pressure fluid can be slowly metered into the chamber 76 through the bore of the valve stem by means of the adjustable timing stem 81 and 381. Additional means are provided in this alternative exemplary embodiment of FIGS. 7 through 9 for slowing the rate of closure of the valve means through the provision of requiring a larger capacity of pressured fluid above the diaphragm means and also through the provision of an air cushion within the valve body.

As seen in FIGS. 7 and 8, a cover shell 360 is provided in an integral one-piece plastic molded shell 361 with outwardly protruding tabs 362' for facilitating fastening the cover to the valve body. Cover shell 361 includes an enlarged airtight chamber 377 partially surrounding the hollow tubular extension 365. Chamber 377 is considerably larger than the chamber 76 of the preferred exemplary embodiment and thus is adapted to receive considerably more pressure fluid during a closing operation. In addition, as the pressure fluid rises within chamber 377, it will compress the air initially contained therein at approximately atmospheric pressure until an internal air pressure is reached equivalent to the inlet pressure in chamber 18. In addition to adding to the volume of pressure fluid required for the opening, and especially the closing, function of the valve, both operations are made much smoother because the air chamber 377 acts as a cushion or shock absorber.

It should be remembered that the foregoing detailed description of various embodiments of the improved valve and valve body construction of the present invention are exemplary in nature only and that the scope of the present invention is not intended to be limited unduly thereby, but rather is defined by the following claims.

I claim:

1. A diaphragm-actuated valve including a body shell, a cover shell fastened over said body shell and a diaphragm-actuated valve means within said shells having a diaphragm separating said shells into upper and lower shell chambers and a valve stem secured to said diaphragm and mounting a resilient gasket member to seat upon a valve seat within said body shell, wherein the improvement comprises the provision of:

an internal bore in said valve stem extending through said diaphragm and gasket member having a lower end port opening to an underside of said diaphragm and an upper sidewall port spaced above said diaphragm; and externally adjustable fluid flow control means including a timing stem with adjustable fluid flow path means disposed within said valve stem bore for controlling the rate of fluid flow from said bore lower end port through said bore sidewall port and including a rodlike upper end extension extending outwardly of said cover shell to be externally engageable for adjusting said fluid flow path means within said valve stem from outside of said valve body shells.

2. The valve of claim 1 wherein:

said adjustable fluid flow path means includes a variable depth spiral groove provided within a portion of said timing stem.

3. The valve of claim 1 wherein:

said timing stem of said externally adjustable fluid flow control means is provided with a lower threaded end received within an internally threaded portion of said valve body shell and remains stationary during opening and closing movement of the valve gasket member and associated valve stem.

4. The valve of claim 1 wherein:

said cover shell includes an enlarged airtight chamber larger than the maximum displacement of said diaphragm-actuated valve means thereinto to provide an air cushion chamber therein to cushion fluid under pressure which is introduced into said cover shell during opening or closing of said diaphragm-actuated valve means.

5. The valve of claim 1 wherein:

said cover shell is provided with a circular boss portion having internal bores communicating with the interior of said cover shell and the exterior thereof, a socket portion in said boss having a plurality of inwardly directed, spaced arcuate lugs on a sidewall thereof and spaced above a bottom wall of said socket, and a valve seat in said socket portion surrounding a valve opening communicating with said bores;

a plastic housing, adapted to receive solenoid means, is provided to be easily assembled to said socket, said housing having a depending support portion including a plurality of outwardly directed lugs to be inserted into said socket portion and rotated under said socket arcuate lugs; and a valve-sealing member mounted to said housing and associated solenoid means to seat on said socket portion valve seat.

6. A method of making an improved plastic valve bodied diaphragm-actuated valve comprising the steps of:

forming a hollow one-piece plastic body shell by plastic injection molding, the body shell having an inlet and an outlet with axes lying generally in the same plane, a ported boss portion disposed generally perpendicular to said axes and a web integrally formed therein in alignment with said boss portion and transversely of said inlet and outlet axes to partition said shell;

inserting an annular retainer in said boss portion of said body shell, said retainer having a peripheral notch;

assembling a diaphragm-actuated valve means into said boss with a peripheral bead of a diaphragm member disposed in said retainer notch and abutting an inner sidewall of said boss, said valve means having closure means to cooperate with said web and body shell to selectively close off said outlet from said inlet; and pressurizing said bead by securing a cover plate thereover to seal abutting surfaces between said bead and each of said retainer notch, boss and cover plate against the passage of water thereby.

7. An improved plastic valve body construction for use in diaphragm-actuated-type valves comprising:

a hollow one-piece plastic body shell having an inlet and an outlet, major axes of said inlet and outlet lying generally in the same plane; an aperture through said shell with a surrounding boss, the plane of said aperture lying generally parallel to and spaced from said axes; a first web extending inwardly of said shell and being an integral extension of said inlet; and a second web of generally circular configuration coaxial with and having a diameter smaller than said aperture which is formed integrally with said body shell and said first web, said first and second webs forming a valve seat generally parallel and aligned to said aperture;

an annular retainer disposed within said boss, said boss having an outer enlarged diameter bore portion terminating inwardly in a circular outwardly facing ledge to receive and support said retainer therein, said retainer having a peripheral notch forming an outwardly opening channel with said boss enlarged diameter bore portion;

a diaphragm-actuated valve means including a diaphragm having a peripheral bead positioned in said channel and a valve stem secured to said diaphragm and mounting a resilient gasket member to seat upon said valve seat, said valve stem extending outwardly of said boss; and a one-piece hollow cover shell having a surrounding generally circular flange provided with a peripheral outwardly facing shoulder to receive an outer end of said boss, said flange having an annular end face adjacent said shoulder to seat upon said diaphragm bead within said boss, said diaphragm bead thereby sealing the junction of said boss, retainer and cover shell against the passage of fluid therebetween.

8. An improved plastic valve body construction as in claim 7 wherein:

said cover shell is provided with an internally threaded tubular extension formed integrally therewith and mounts a separately formed one-piece plastic combination handle and externally threaded sleeve means longitudinally adjustable within said cover shell extension for slidably receiving said valve stem therein to align said stem to said valve seat and for adjustably limiting the outward movement of said stem and associated gasket member away from said valve seat.

9. The improved plastic valve body construction of claim 8 wherein:

said valve stem is hollow, extends through said gasket member, has a lower end port opening to an underside of said diaphragm and below said gasket member and is provided with a sidewall port therein spaced above said diaphragm;

said combination handle and sleeve means is provided with a bore extending through a handle portion thereof and communicating with the interior of a sleeve portion thereof; and externally adjustable fluid flow control means are provided including a timing stem with adjustable fluid flow path means disposed within said hollow valve stem for controlling the rate of fluid flow from said stem lower end port through said stem sidewall port and including a rodlike upper end extension extending outwardly of said cover shell through said associated combination handle and sleeve means bore to be externally engageable for adjusting said fluid flow path means within said valve stem from outside of said valve body.

10. THe improved plastic valve body construction of claim 9 wherein:

said adjustable fluid flow path means includes a variable depth spiral groove provided within a portion of said stem and surrounding portions of said hollow valve stem receiving said timing stem.

11. The improved plastic valve body construction of claim 9 wherein:

said timing stem of said externally adjustable fluid flow control means is provided with a lower threaded end received within an internally threaded portion of said valve body and remains stationary during opening and closing movement of said valve gasket member and associated valve stems.

12. The improved plastic valve body construction of claim 7 wherein:
said cover shell flange is provided with an integral circular boss portion having internal bores communicating with the interior of said cover shell and the exterior thereof, an integral socket portion having a plurality of inwardly directed, spaced arcuate lugs on a sidewall thereof and spaced above a bottom wall of said socket, and a valve seat in said socket portion surrounding a valve opening communicating with said bores and said outlet;

a plastic housing, adapted to receive solenoid means, is provided to be easily assembled to said socket, said housing having a depending support portion including a plurality of outwardly directed lugs to be inserted into said socket portion and rotated under said socket arcuate lugs; and a valve-sealing member mounted to said housing and associated solenoid means to seat on said socket portion valve seat in response to operation of said solenoid means.

13. The improved plastic valve body construction of claim 7 wherein:
said hollow one-piece cover shell includes an enlarged airtight chamber larger than the maximum displacement of said diaphragm-actuated valve means thereinto to provide an air cushion chamber therein to cushion fluid under pressure which is introduced into said cover shell during opening or closing of said diaphragm-actuated valve means.